Patented Feb. 26, 1935

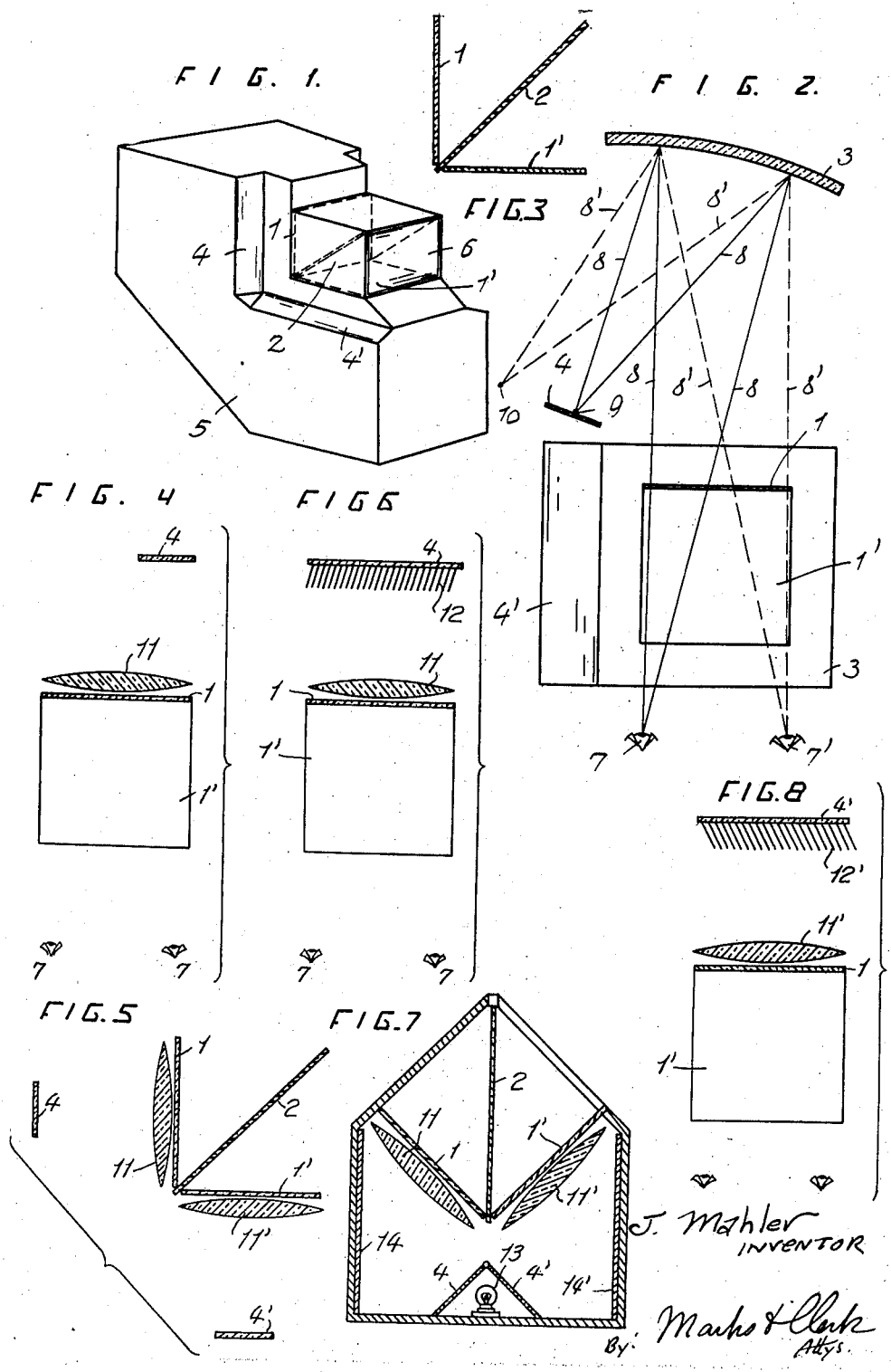

1,992,872

UNITED STATES PATENT OFFICE 1,992,872

STEREOSCOPIC APPARATUS

Josef Mahler, Nemecky Brod, Czechoslovakia

Application March 16, 1934, Serial No. 715,987
In Germany November 7, 1933

6 Claims. (Cl. 88—29)

This invention relates to means for viewing stereoscopic pictures in relief.

The invention is diagrammatically illustrated by way of example in the accompanying drawing, in which Figure 1 is a perspective view of the apparatus, Figures 2, 4 and 6 are horizontal sections of different modifications, Figures 3 and 5 are vertical sections, and Figure 7 shows a modified form of construction of the apparatus in cross section.

Figure 8 is a vertical section similar to Figure 6 of the second optical system.

The apparatus consists essentially of two optical projection systems placed at right angles to one another, one for each of the two stereo-diapositives 1, 1'. Each optical system consists of a concave mirror 3 and a translucent plate or focussing screen 4 through which light shines. The two stereo-diapositives 1 and 1' are placed at right angles to one another, as shown in Figure 3. Starting from the line of intersection of their planes there is a very thin glass plate 2, so placed that it makes an angle of 45° with each of them. Instead of the thin glass plate there may alternatively be employed a so-called transparent mirror, that is to say, a finely silvered glass plate. The entire apparatus is preferably enclosed in a box or casing 5, the shape of which will be seen from Figure 1. This casing comprises a peep hole or inspection aperture, preferably covered by a glass plate 6, or by a magnifying glass, this aperture or glass being opposite to the vertical diapositive 1. The other walls of the casing are formed by the translucent plates 4 and 4', which can therefore be illuminated by any convenient source of light, or by daylight. The other walls of the casing 5 are opaque. The mutual adjustment of the individual constituent parts of the apparatus will now be explained with respect to Figure 2, firstly for the optical system for the upright diapositive 1, which contains the photograph intended to be viewed by the left eye.

The mirror 3 is of such form and is so placed behind the diapositive 1 that all the rays 8 starting from the left eye 7 and reflected by the mirror 3 meet at a point 9 the translucent plate or focussing screen 4. The rays 8' starting from the right eye 7' and passing through the upright diapositive 1 are shown in dotted lines and converge, after being reflected by the mirror 3, to a focus 10, which however is located outside the focussing screen 4 in the dark interior of the case 5. Consequently only the left eye 7 sees the upright diapositive 1. The other optical system 3', 4' is similarly constructed so that the diapositive 1' is only seen by the right eye, its image being erected into a vertical position by being reflected from the glass plate 2 shown in Figure 3.

The observer therefore sees with the left eye 7 only the image of the diapositive 1, and with the right eye 7' only the image of the diapositive 1', the two images registering with one another and forming together a composite stereoscopic or relief image. The observer can therefore change his position, within the limits given by the dimensions of the inspection aperture 6 or the breadth of the focussing screens 4 and 4', without thereby impairing the effect.

Instead of the mirrors 3 and 3' convergent lenses 11 and 11' may be employed, which are arranged immediately behind or in front of the corresponding diapositives 1 and 1', as shown in Figures 4 and 5.

In order to widen the limits within which the observer may vary his position, focussing screens may be employed the breadth of which corresponds to that of the diapositives, as shown in Figure 6. In this case the focussing screen has a grating placed in front of it consisting of a series of thin opaque strips 12 or 12', which are placed at an inclination to the focussing screen and at equal distances apart, the strips 12 placed in front of the translucent plate 4 being inclined towards the left, and the strips 12' placed in front of the plate 4' being inclined towards the right.

A particularly compact form of construction of the apparatus is illustrated in cross section in Fig. 7. This constructional form is essentially distinguished from those previously described merely by the fact that the two translucent screens 4 and 4' are arranged roofwise on the bottom of the box 5', being perpendicular not only to one another but also each to the associated stereo-diapositive 1 or 1', with the interposition of mirrors 14, 14' making an angle of 45° both with the planes of the focussing screens and also with those of the stereo-diapositives, so that they can both be illuminated by a single source of light, such as an electric lamp 13.

What I claim is:—

1. An apparatus for viewing in relief a pair of translucent stereoscopic pictures, comprising in combination a casing consisting mainly of opaque material, an inspection aperture in said casing, a pair of transparent stereoscopic pictures arranged inside said casing in planes at right angles to one another, one picture being disposed parallel to the plane of said inspection aperture and opposite it, and the other picture being disposed between the lower horizontal edges of said first picture and said inspection aperture, a transparent reflecting member arranged in the angular space between said two pictures and making an angle of forty-five degrees with each of them, and two optical focussing systems arranged inside said casing at right angles to one another, each of said optical systems consisting of a focussing member disposed opposite one of said pictures and of a translucent plate disposed so as to go through the focus of the respective focussing member the focussing system of the left eye having one focal point on one of the translucent plates and a conjugate focal point at place corresponding to the place for the left eye, and a focussing system for the right eye having one focal point on the other translucent plate, and a conjugate focal point at place corresponding to the place for the right eye.

2. Apparatus as per claim 1, in which the focussing member is a concave mirror.

3. Apparatus as per claim 1, in which the focussing member is a lens.

4. Apparatus as per claim 1, in which the translucent plates form a part of the casing.

5. Apparatus as per claim 1, in which the translucent plates are disposed inside the casing at right angles to one another and at right angles to the respective pictures, and further comprising a source of light illuminating the two translucent plates, and two mirrors, each making angles of forty-five degrees with one of the pictures and with one of the translucent plates.

6. Apparatus as per claim 1, further comprising gratings consisting of thin opaque strips placed in front of said translucent plates, said strips forming with said plates angles other than right angles the strips for the left eye picture being arranged at an angle to obscure the left eye picture from the right eye position and to expose the picture to the left eye position, and the strips for the right eye picture being arranged at an angle to obscure the right eye picture from the left eye position and to expose the picture to the right eye position.

JOSEF MAHLER.